United States Patent [19]

Antuna et al.

[11] Patent Number: 5,307,623
[45] Date of Patent: May 3, 1994

[54] APPARATUS AND METHOD FOR THE DIASSEMBLY OF AN ULTRA HIGH BYPASS ENGINE

[75] Inventors: Eugene J. Antuna, Springdale; Donald F. Keck, Fairfield, both of Ohio

[73] Assignee: General Electric Company, Cincinnati, Ohio

[21] Appl. No.: 129,874

[22] Filed: Sep. 29, 1993

Related U.S. Application Data

[63] Continuation of Ser. No. 994,184, Dec. 21, 1992, abandoned, which is a continuation of Ser. No. 708,263, May 28, 1991, abandoned.

[51] Int. Cl.$^5$ .............................. F02K 3/02
[52] U.S. Cl. ..................... 60/226.1; 60/39.31; 416/245 R
[58] Field of Search ............... 60/226.1, 226.2, 39.31; 244/54; 415/218.1; 416/245 R

[56] References Cited

U.S. PATENT DOCUMENTS

| | | | |
|---|---|---|---|
| 3,750,983 | 8/1973 | Morris | 60/226.1 |
| 4,022,018 | 5/1977 | Tuten et al. | 60/39.31 |
| 4,044,973 | 8/1977 | Moorehead | 244/54 |
| 4,147,029 | 4/1979 | Sargisson | 60/262 |
| 4,384,453 | 5/1983 | Tudor et al. | 244/54 |
| 4,405,285 | 9/1983 | Surdi | 416/245 R |
| 4,940,196 | 7/1990 | Lardellier | 244/54 |

FOREIGN PATENT DOCUMENTS

| | | |
|---|---|---|
| 0453360A | 10/1991 | European Pat. Off. |
| 2069427A | 8/1981 | United Kingdom |
| 2202588A | 9/1988 | United Kingdom |
| 2219046A | 11/1989 | United Kingdom |

OTHER PUBLICATIONS

Brochure on the "CFM 56, fan and booster assembly" by CfM International Nov. 1979.
Brochure on the "PW2040", FAA Certification 1987, by United Technologies.

*Primary Examiner*—Richard A. Bertisch
*Assistant Examiner*—Michael I. Kocharov
*Attorney, Agent, or Firm*—Jerome C. Squillaro; Nathan D. Herkamp

[57] ABSTRACT

An apparatus and method for the disassembly of an ultra high bypass turbine engine having an outer engine portion and an inner engine portion. A plurality of fan blades and acoustic panels are removed from the inner portion of the engine. The outer portion of the engine which includes a plurality of fan outlet guide vanes and fan casing are disconnected from the engine and axially removed. Certain outer portions of the engine including a hinged thrust reverser and hinged fan cowling may be coupled to an aircraft pylon and used interchangeably with replacement engines.

4 Claims, 4 Drawing Sheets

APPARATUS AND METHOD FOR THE DIASSEMBLY OF AN ULTRA HIGH BYPASS ENGINE

This application is a continuation of application Ser. No. 07/994,184, filed Dec. 21, 1992, now abandoned, which is a continuation of application Ser. No. 07/708,263, filed May 28, 1991, now abandoned.

BACKGROUND OF THE INVENTION

The present invention relates to a method and apparatus for the disassembly of a turbofan gas turbine engine. More particularly, the present invention relates to an apparatus and method for removing substantially intact the inner portion of the engine so that no disconnection of shafts or intricately aligned components is necessitated.

Turbofan gas turbine engines generally include a core engine coupled in driving relationship to a forward mounted fan module. The fan module, in a high-bypass ratio engine, includes a large diameter single stage fan and a multiple stage intermediate pressure compressor or booster. The fan is surrounded by a fan casing supported by a plurality of structural members which are, in turn, supported on a casing surrounding the booster. The core engine includes a high pressure compressor, a combustor and a multi-stage turbine for extracting energy from combustion gases exiting the combustor for driving the compressors and fan.

Mounting of such high-bypass engines on an aircraft generally requires one or more structural supports which connect the engine to a structural member, sometimes referred to as a strut or pylon, on a wing or fuselage, depending upon the mounting location. The structural supports extend through an aerodynamic cowling, sometimes referred to as a nacelle, and couple to the engine casing. Coupling may be to the fan casing (or shroud) and to the casing surrounding the turbine. In general, some form of structural yoke is attached to the engine casing and the structural supports attach to the yoke.

As gas turbine engines have become more powerful and larger, a concern has developed with handling and transporting of such engines. In particular, engines are now being developed with fans and fan casings having diameters in the range of twelve feet. Transporting of such engines by air or ground is not practical with current commercial aircraft and over-the-road transportation guidelines. Accordingly, it is desirable to provide method of assembly and disassembly of such engines which permits transport without exceeding aircraft or ground transport size limitations.

The problems associated with handling and transporting of such large engines extends beyond shipments to the installation, removal, and handling of the engines in aircraft servicing. It is therefor further desirable to provide a method and apparatus for servicing of such engines which overcome the problems associated with such large diameter fans.

SUMMARY OF THE INVENTION

Accordingly, one object of the present invention is to allow for the disassembly of a large turbofan engine without the need of radical disassembly of the inner engine components.

Yet another object of the present invention is to allow for the disassembly of a large turbofan engine without the need of breaking or disconnecting shafts located in the inner portion of the engine.

Still another object of the present invention is to allow for the disassembly of a large turbofan engine which makes the transportation of engine parts more easily accomplished.

These and other valuable objects and advantages are achieved by an engine assembly having an outer and inner portion with the outer portion comprised of a fan case, and a plurality of structural and aerodynamic members. The inner portion of the engine extends from a spinner assembly to the primary nozzle and includes the engine components located radially inward from a thrust reverser.

In one form, beginning with an engine mounted on an aircraft pylon in an under-wing configuration, a hinged fan cowling is opened to allow easier access to the outer portion of the engine. The fan cowling may be connected to the pylon and remain on the aircraft or be removed using a conventional A-frame hoist. A hinged D-duct type thrust reverser is opened to provide access to the aft portion of the engine. The reverser preferably is coupled to the pylon so that it can remain on the aircraft. A dolly/engine cradle is positioned under the engine and attached to the engine at forward and aft engine mounts. The engine is then uncoupled from the pylon, electrical and hydraulic lines released, and the engine and attached cradle lowered onto the dolly and removed from the aircraft.

Once removed from the aircraft, the engine can be disassembled for transport by first removing the inlet. A conventional A-frame may be utilized for this purpose. Thereafter, a two-piece fan spinner is removed to provide access to the retaining mechanism for the fan blades and platforms. After removing the fan blades and platforms, the acoustic panels are removed to provide access to bolts at the front of the hub of the outlet guide vanes (OGV). These bolts are removed to release OGV's from the OGV hub. A fan case dolly is positioned under the fan case during the final releasing steps to support the fan case which is thereafter removed from the engine. A protective cover is preferably placed over the fan disk and booster after removal of the fan case. Finally, the exhaust nozzle is removed and the engine is ready for transport to an overhaul facility.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

When referring to the drawings, it is understood that like reference numerals designate identical or corresponding parts throughout the several views.

THE DETAILED DESCRIPTION OF THE INVENTION

Figure 1:
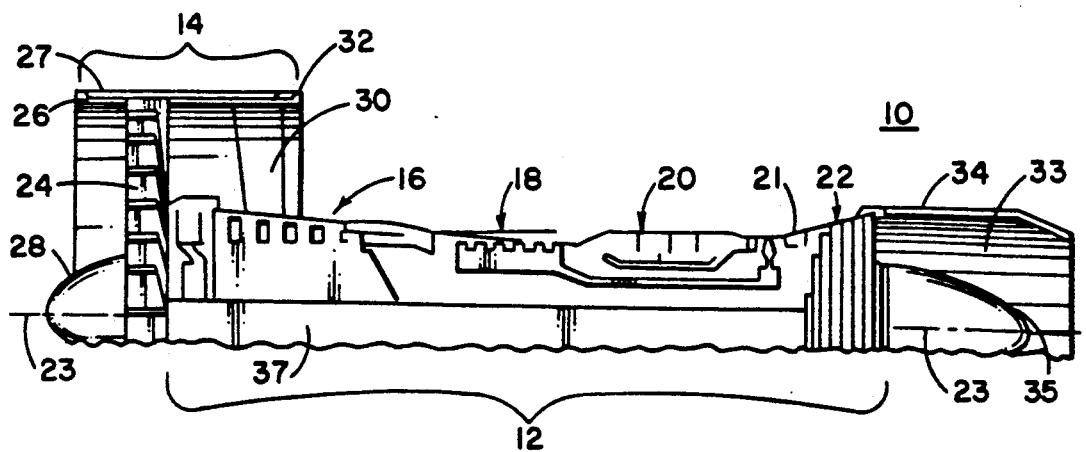
FIG. 1 is a simplified partial cross-sectional drawing of an exemplary gas turbine engine.

Referring first to FIG. 1, there is shown a partial cross-sectional drawing of an exemplary high-bypass ratio gas turbine engine 10 having a core engine portion indicated at 12 and a stator or fan portion indicated at 14. The core or engine portion 12 may be referred to as the rotor module. The rotor module or core engine 12 includes an intermediate pressure compressor or booster stage 16, a high pressure compressor stage 18, a combustor stage 20, a high pressure turbine stage 21, and a low pressure turbine stage 22 all aligned on an engine centerline 23. The fan portion 14 comprises fan cowling 27, fan blades 24, spinner assembly 28 and fan casing 26. The fan cowling 27 surrounds the fan casing 26 and radially encloses the fan portion of the engine 10.

The fan spinner assembly 28 located forward of the fan blades 24 connects to a rotor module 12, rotor module 12 being a part of the core engine 12. To the aft of fan blades 24 is located a plurality of circumferentially spaced outlet guide vanes or fan frame struts 30 which are a part of the fan portion 14. The outlet guide vanes 30 connect the engine core 12 to the fan portion of the engine 10 and provide structural support. At the rear of engine 10 is located primary nozzle 33 which includes an outer member 34 and an inner member 35. A fan shaft 37 driven by turbine stage 22 extends through the engine and is coupled in driving relationship with booster stage 16. Fan shaft 37 turns fan blades 24 via fan rotor module 12.

As will be apparent from FIG. 1, handling of the engine 10 is a major problem for very large diameter fan blades 24. While it is possible to remove the blades 24, the practice in the art is to treat the blades 24, booster stage 16, and fan case 26 as a unitary module. Some engines are constructed with a two-piece fan shaft separable aft of the booster stage 16 approximately along the line 23. These engines are identified as split fan engines. Assembly and/or disassembly of split fan engines is complicated since it is difficult to attach the fan forward shaft and the fan mid shaft properly. In such split fan methods of separating an engine, the forward module includes the fan case 26, structural outlet guide vanes 30, fan spinner assembly 28, fan blades 24, along with fan rotor 38, booster stage 16 and the forward portion of shaft 37.

Thus, it has not been practical to separate the fan module and large external components for the core engine to facilitate handling. Furthermore, it is not desirable to separate an engine where such separation includes a rotating interface since such an interface may involve bearings or critical alignments.

Figure 2:
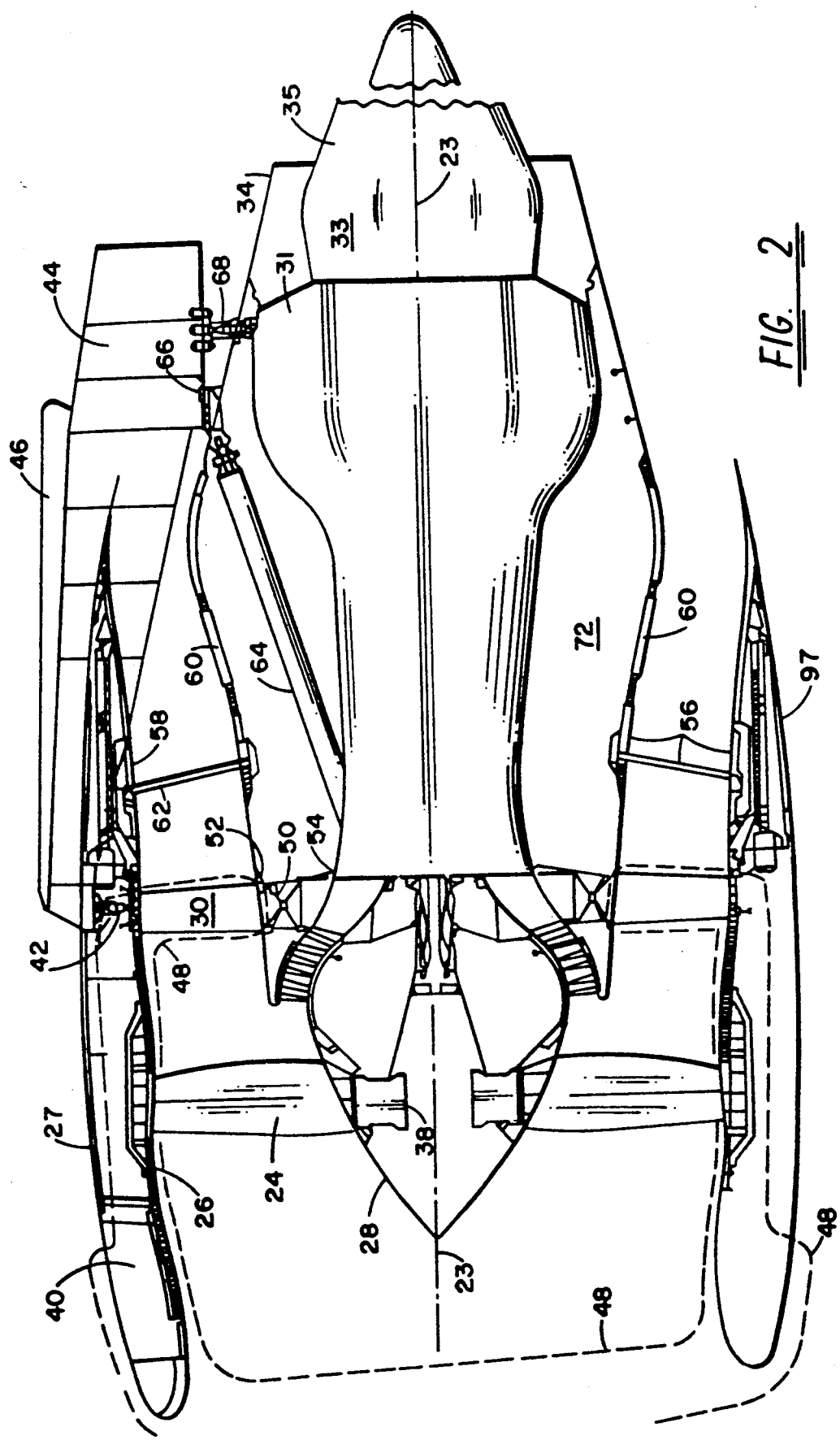
FIG. 2 is a simplified schematic side view illustration of the engine assembly of the present invention.

Turning now to FIG. 2, a simplified schematic illustration of the present invention's engine assembly, which is similar to FIG. shows an inlet 40 and fan cowling 27 located at the extreme front of the engine, the circumferential shape of the inlet forming an air passage by which air can enter the engine. To the aft of inlet 40 is fan case 26 which may be connected to fan cowling 27. Fan case 26 surrounds the fan blades 24 which are located radially inward therefrom. To the aft of fan blades 24 lie the fan outlet guide vanes (OGV's) 30 whose distal end portions in the outward radial direction are connected to fan casing 26. In addition, the front engine mount 42 connects to the wing pylon 44 which is attached to aircraft wing 46. Broken line 48 of FIG. 2 indicates the outer portion of the engine and includes the inlet 40, fan casing 26 and fan outlet guide vanes 30.

The radially inward distal end portion of each fan outlet guide vane 30 is attached to fan outlet guide vane support member 50 and attached thereto by means of bolts 52. Support member 50 connects to booster casing 54 which surrounds the booster area of the engine.

To the aft of fan cowling 27 and fan outlet guide vanes 30 is located a D-duct type thrust reverser 56 which includes a fan portion 58, a core portion 60 and links 62. The links 6 extend circumferentially around core portion 60. Located radially inward from core portion 60 of thrust reverser 56 is thrust link 64 which is attached at one end to pylon 44 at location 66, location 66 being to the aft of thrust reverser 56. The other end of thrust link 64 is connected to booster case 54 by means of brackets (not shown) which extend circumferentially around booster case 54. To the aft of location 66 is rear engine mount 68 which connects pylon 44 to a frame 31 on core engine 12.

The inner portion 72 of the engine of FIG. 2 may be defined as that portion of the engine extending from the spinner assembly 28 to the primary nozzle 33 which is located radially inward of the thrust reverser 56. The inner portion of the engine does not include the fan outlet guide vanes 30 which have been defined to be a part of the outer portion of the engine as they are inside broken line 48 of FIG. 2.

Figure 3:
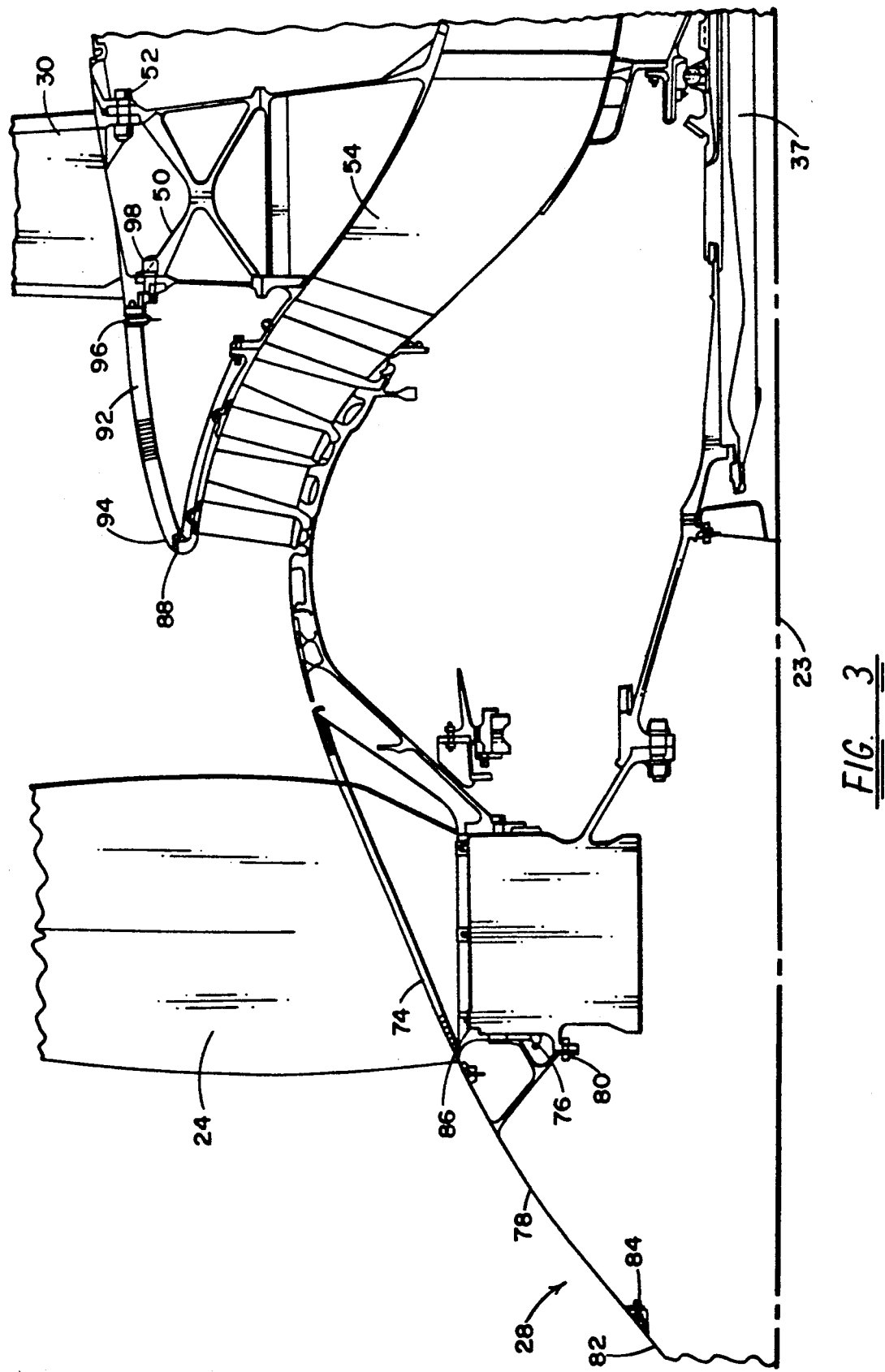
FIG. 3 is a close-up, simplified schematic illustration of the rotor and booster regions of the present invention.

FIG. 3 is an enlarged, partial cross-sectional illustration of the fan blade and OGV attachment portion of the present invention and shows fan blade 24 connected to blade platform 74. The blades 24 are secured to rotor assembly 38 by means of anti-clank spring 76. Aft spinner 78 is connected to rotor assembly 38 by means of bolt 80 and forward spinner 82 is connected to aft spinner 78 by means of bolt 84. Pin 86 connects the blade platform 74 to rotor assembly 38.

Acoustic panels 92 are connected to the booster casing 54 by means of a tongue and groove slip joint 94. The acoustic panels are also connected to support 50 by bolts 96. The fan outlet guide vanes 30 are connected to support 50 by bolts 52 and 98.

Returning to FIG. 2 the fan cowling 27 and thrust reverser 56 of the present invention are both hinged and divided into bifurcated assemblies which allow easy access to inside engine components when open. Such hinged cowling and thrust reversers are well known and appreciated by those in the art. U.S. Pat. No. 3,541,794 to Johnston et al. is an example of a hinged and bifurcated thrust reverser and is herein incorporated by reference. The respective half sections of the fan cowling and reverse thruster are pivotally attached to the pylon which extends from the aircraft wing. The respective half sections of the fan cowling and reverse thruster are secured in a closed position by latching means. The location of the latching means of thrust reverser 56 is indicated at 97 (FIG. 2). A secured latched position is of course necessitated during times of engine operation. However, if access to the inner engine is desired, the respective half sections of the fan cowling 27 and thrust reverser 56 can be unlatched and rotated upward to afford access to the entire length of the engine.

Figure 4:
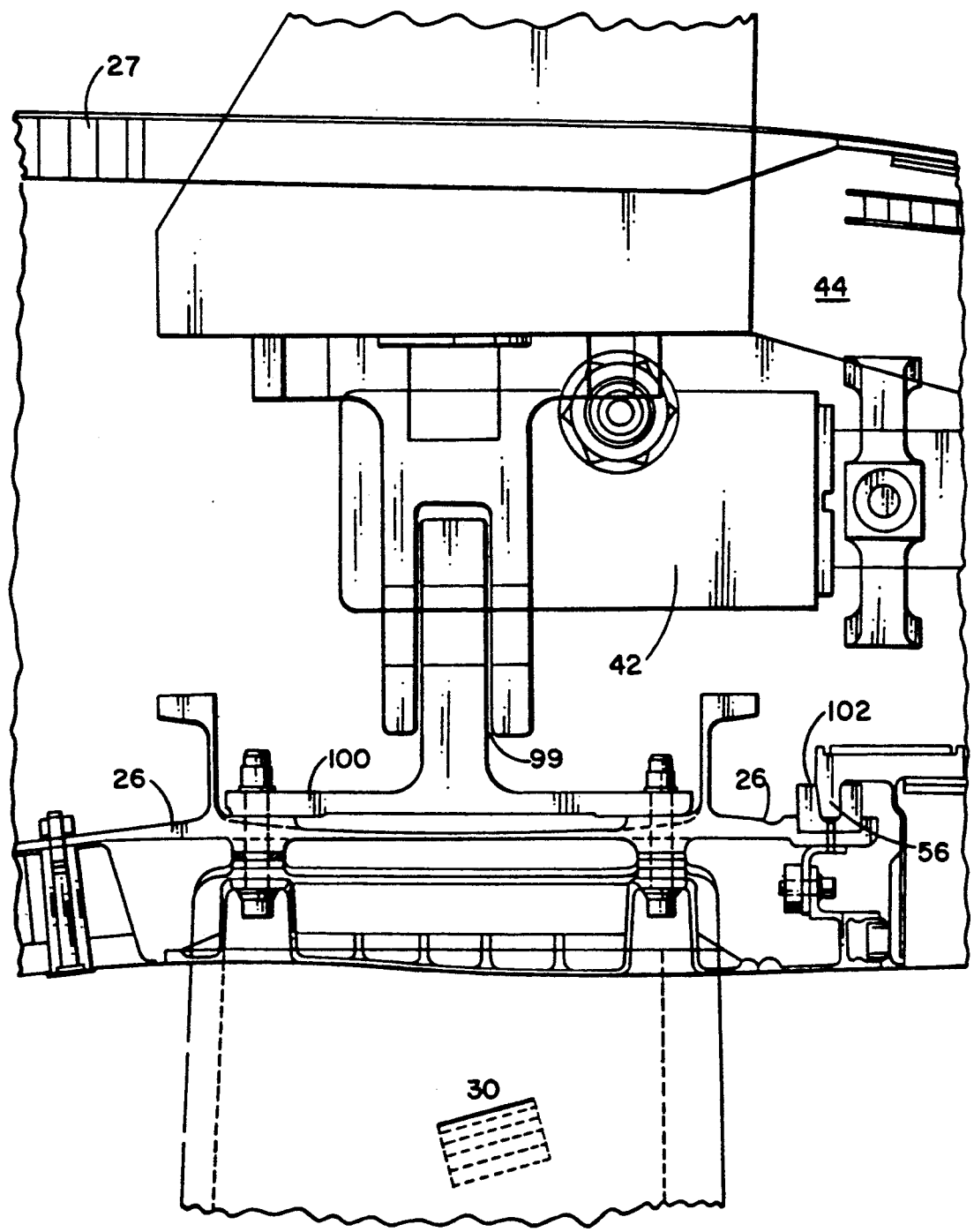
FIG. 4 is a close-up schematic illustration of the front engine mount of the present invention.

FIG. 4, is an enlarged, partial illustration of the front engine mount 42 adjacent a radially outer end of an OGV 30. The front engine mount 42 is connected to pylon 44 and forms a clevis joint 99 with support member 100, support member 100 being connected to the outlet guide vanes 30 and fan casing 26. Immediately aft of member 100 there is an annular tongue and groove joint 102 connecting the thrust reverser 56 to the fan casing 26.

Figure 5:
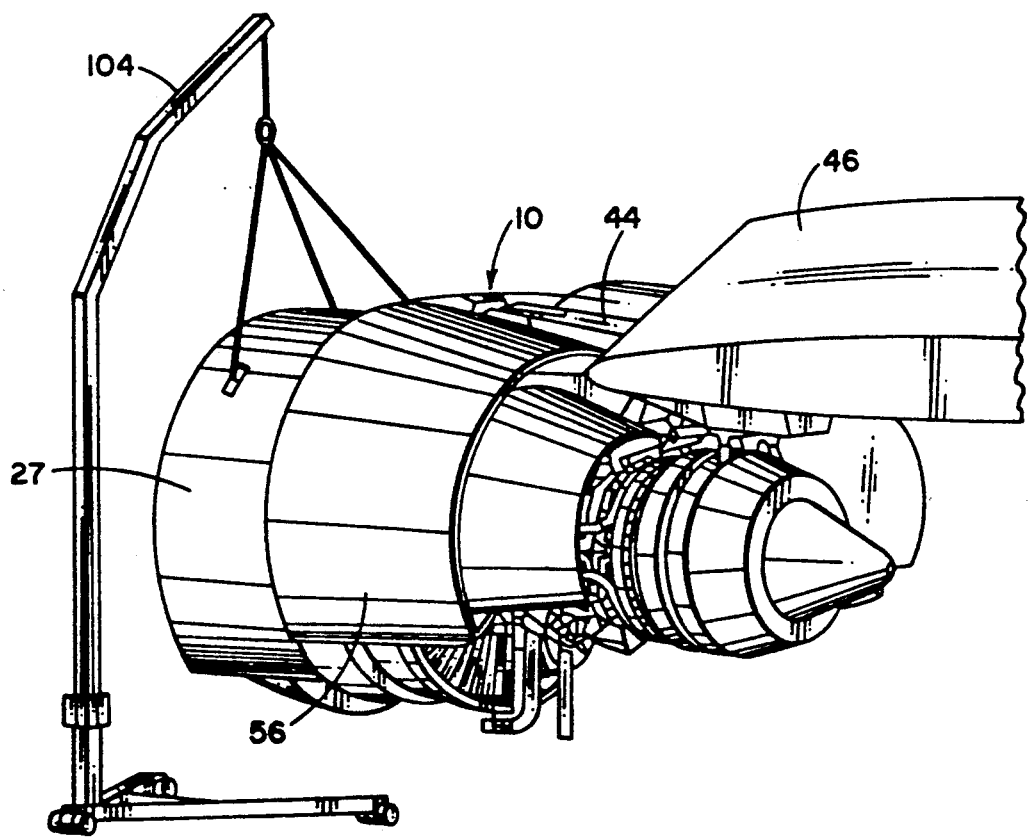
FIG. 5 is a perspective illustration which illustrates the thrust reverser and fan cowling of the present invention.

With reference to FIG. 5, a simplified schematic illustration of an engine in the process of being removed or attached is presented showing an open thrust reverser 56 and fan cowling 27, both being pivotally attached to pylon 44. However, as indicated by the presence of A-frame type hoist 104, the fan cowling 27 may be removed from the engine rather than remaining on the pylon during engine installation or removal. Assuming for purpose of discussion that the engine is to be removed from the aircraft for service, the hinged fan cowling 27 and thrust reverser 56 are opened to the configuration shown in FIG. 5. An engine cradle and dolly assembly (not shown) of a type well known in the art but which is specifically designed to fit the engine 10 is rolled under the engine and the cradle raised into a receiving position. The cradle is attached to the engine prior to disconnecting the engine from the pylon. The engine is disconnected from the pylon by removing the bolts at the forward and aft mounts 42 and 68 (see FIG. 2). Thrust link 64 is also disconnected from pylon 44 at location 66. Finally, the electrical and hydraulic connections at the aircraft interface junction box (not shown) are disconnected freeing the engine from the aircraft. The cradle and engine are then lowered onto the dolly and rolled to an engine disassembly location.

For engine disassembly, the inlet 40 may be, but is not necessarily, removed using another A-frame type hoist similar to hoist 104. Thereafter, the forward spinner 82 is removed from the engine assembly 10 by removing bolts 84 (see FIG. 3). The aft spinner 78 is removed by removing bolts 80 from the rotor assembly 38. The fan blade platforms 74 are removed after removing retaining bolts or pins 86. The fan blades 24 can be removed after removing the anti-clank spring 76. The acoustic panels 92 are removed by removing bolts 96 and separating tongue and groove slip joint 94. This latter step provides access to the bolts 98 connecting the outlet guide vanes 30 to the engine. Disconnection of the radially inward side of the fan OGV's 30 can be completed by disconnecting bolts 5 from the support 50. The fan case 26 and the still connected OGV's 30 are supported on another dolly/cradle and can be separated from the engine following the above described steps. Thereafter, the exhaust nozzle 33 may be removed, a protective cover (not shown) placed over the fan disk and booster and the engine is ready for transport to an overhaul facility.

The foregoing detailed description has been intended to be illustrative and non-limiting. Many changes and modifications are possible in light of the above teachings. Thus, it is understood that the invention may be practiced otherwise than as specifically described herein and still be within the scope of the appended claims.

What is claimed is:

1. A detachable turbofan engine assembly connectable to an aircraft through a pylon, said assembly having an outer engine portion and an inner engine portion, said outer engine portion including a plurality of outlet guide vanes, a fan casing supported on said outlet guide vanes and an air inlet for directing air into said fan casing, said inner engine portion including a plurality of fan blades operatively coupled to a core engine including a booster stage, a combustor stage and a turbine stage, said assembly comprising:

a hinged thrust reverser operable for accessing said inner engine portion;

a hinged fan cowling operable for accessing said outer engine portion;

a thrust link and forward and aft mounts for connecting said inner engine portion to the pylon attached to the aircraft;

a spinner assembly forming a generally pointed, aerodynamically shaped member having a gradually increasing diameter from forward to aft of the fan blades, a maximum diameter of the spinner assembly occurring immediately forward of the booster stage;

an inner engine liner forming a continuation of the spinner assembly and having a maximum diameter generally concurrent with a first nozzle blade of the booster stage, the inner engine liner having an aerodynamically smooth decreasing diameter from said first nozzle blade to the combustor stage;

a booster casing enclosing the booster stage and having a decreasing diameter from the first nozzle blade to about a last booster stage blade;

an outer core engine housing having a forward edge coupled to a forward edge of said booster casing, said outer housing increasing in diameter from said forward edge to about an aft edge of said fan cowling;

a plurality of fan outlet guide vane support members coupled between said booster casing and said outer core engine housing, said support members being positioned aft of at least some of said booster stage and circumferentially spaced about said booster casing, said booster casing forward of said support members having a larger diameter than at said support members;

means for releasably connecting each of said outlet guide vanes to a radially outer end of a corresponding one of said support members at a radial location defining a circumferential coupling joint having a diameter greater than a forward end of said booster stage; and fan blade removing means for removing the fan blades from the core engine and thereafter axially separating the core engine from said outer engine portion such that the booster stage of said core engine passes through the outlet guide vanes when said core engine is separated from said outer engine portion, said booster stage being an integral part of said core engine.

2. The engine assembly according to claim 1 wherein said fan cowling and said thrust reverser are connected to the pylon.

3. An assembly according to claim 2 wherein said plurality of outlet guides vanes are releasably connected at their respective radially inner ends to the inner portion of the engine assembly.

4. The detachable turbofan engine assembly of claim 1 wherein said plurality of fan blades in said engine assembly comprise a plurality of separately removable fan blades and said inner engine portion includes said booster stage and all rotating engine elements aft of said fan blades.

* * * * *